US009538452B2

(12) United States Patent
Bellamkonda et al.

(10) Patent No.: US 9,538,452 B2
(45) Date of Patent: Jan. 3, 2017

(54) MANAGEMENT OF AD-HOC PEER-TO-PEER CONNECTIONS TO PROVIDE DATA NETWORK ACCESS USING A PLURALITY OF HETEROGENEOUS WIDE AREA NETWORKS

(71) Applicant: Google Technology Holdings LLC, Mountain View, CA (US)

(72) Inventors: Krishna K Bellamkonda, Lake Zurich, IL (US); Nischal Y Patel, Gilberts, IL (US); Brett L Robertson, Mundelein, IL (US); Jarrett K Simerson, St. Charles, IL (US); Dean E Thorson, Grayslake, IL (US); Malhar D Vaishnav, Gilberts, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 168 days.

(21) Appl. No.: 14/054,376

(22) Filed: Oct. 15, 2013

(65) Prior Publication Data

US 2015/0055504 A1    Feb. 26, 2015

Related U.S. Application Data

(60) Provisional application No. 61/869,106, filed on Aug. 23, 2013.

(51) Int. Cl.
*H04W 88/04* (2009.01)
*H04W 40/24* (2009.01)
(Continued)

(52) U.S. Cl.
CPC ........... *H04W 40/246* (2013.01); *H04W 16/26* (2013.01); *H04W 84/18* (2013.01); *H04W 88/04* (2013.01)

(58) Field of Classification Search
None
See application file for complete search history.

(56) References Cited

U.S. PATENT DOCUMENTS 7,720,098 B1    5/2010   Allen et al.
8,170,056 B2    5/2012   Allen et al.
(Continued)

OTHER PUBLICATIONS

Suresh Singh, et al. "Power-Aware Routing in Mobile Ad Hoc Networks", MobiCom '98 Proceedings of the 4th annual ACM/IEEE international conference on Mobile computing and networking, pp. 181-190.

(Continued)

*Primary Examiner* — Michael J Moore, Jr.
*Assistant Examiner* — Ayanah George
(74) *Attorney, Agent, or Firm* — Faegre Baker Daniels LLP

(57) ABSTRACT

A method includes collecting physical layer and data layer connectivity information from a plurality of wide area networks using a plurality of mobile devices independently of the wide area networks. A server receives the physical layer and data layer connectivity information, relates the connectivity information to specific wide area networks and to a plurality of geographic locations to create a network statistics database. The server also receives mobile device state information including mobile device location information and predicts that connectivity for a specific mobile device will fall below acceptable criteria based on the network statistics database. The server generates a list of candidate donor mobile devices to serve as data connection sources for the specific mobile device based on the network connectivity information and the mobile device state information and selects a donor device from the list of candidate donor devices based on a weighting algorithm.

20 Claims, 7 Drawing Sheets

(51) Int. Cl.
 *H04W 16/26* (2009.01)
 *H04W 84/18* (2009.01)

(56) References Cited

U.S. PATENT DOCUMENTS

| | | | | |
|---|---|---|---|---|
| 8,355,343 | B2* | 1/2013 | Kish | H04L 45/125 370/254 |
| 2004/0085909 | A1* | 5/2004 | Soliman | H04W 24/02 370/252 |
| 2006/0015576 | A1* | 1/2006 | Seo | H04L 12/14 709/219 |
| 2006/0056370 | A1* | 3/2006 | Hancock | H04B 7/2606 370/338 |
| 2006/0239207 | A1 | 10/2006 | Naghian | |
| 2008/0300890 | A1 | 12/2008 | Dawson et al. | |
| 2009/0240758 | A1* | 9/2009 | Pasko | H04L 67/104 709/201 |
| 2013/0003606 | A1* | 1/2013 | Dawson | G06Q 40/00 370/255 |
| 2015/0004930 | A1* | 1/2015 | Kim | H04W 48/18 455/406 |

OTHER PUBLICATIONS

Weizhao Wang and Xiang-Yang Li, "Low-Cost Routing in Selfish and Rational Wireless Ad Hoc Networks", Mobile Computing, IEEE Transactions on vol. 5, Issue: 5, May 2006, pp. 596-607.

Lijuan Cao and Teresa Dahlberg, "Path Cost Metrics for Multi-Hop Network Routing", Performance, Computing, and Communications Conference, 2006. IPCCC 2006. 25th IEEE International, Apr. 10-12, 2006, pp. 15-22.

Jeffrey Hemmes, et al. "Predictive Routing in Mobile Ad-Hoc Networks", Next Generation Mobile Applications, Services and Technologies (NGMAST), 2011 5th International Conference, Sep. 14-16, 2011, pp. 117-122.

* cited by examiner

MANAGEMENT OF AD-HOC PEER-TO-PEER CONNECTIONS TO PROVIDE DATA NETWORK ACCESS USING A PLURALITY OF HETEROGENEOUS WIDE AREA NETWORKS

CROSS-REFERENCE TO RELATED APPLICATIONS

The present patent application claims priority to U.S. Provisional Patent Application No. 61/869,106, filed Aug. 23, 2013, entitled "MANAGEMENT OF AD-HOC PEER-TO-PEER CONNECTIONS TO PROVIDE DATA NETWORK ACCESS USING A PLURALITY OF HETEROGENEOUS WIDE AREA NETWORKS," which is assigned to the same assignee as the present patent application, and which is hereby incorporated by reference herein in its entirety.

FIELD OF THE DISCLOSURE

The present disclosure relates generally to wireless networks and devices and more particularly to wireless ad-hoc networks and radio coverage extension.

BACKGROUND

Numerous routing protocols have been developed for establishing ad-hoc networks where a mobile device may obtain extended network coverage to a wide area network by using ad hoc network connections with one or more peer mobile devices. For example various routing schemes have been developed around Quality of Service (QoS) considerations because different applications have different requirements pertaining to QoS. That is, such QoS aware routing schemes attempt to find ad-hoc paths based on network throughput, pack delivery ratio, reliability, delay, delay jitter, packet loss rate, bit error rate, and path loss. An ad-hoc network must exhibit self-organization and self-maintaining properties including such required activities such as neighbor discovery, topology organization and re-organization. However such properties often require specific network information that may require access to a specific wide area network statistical information database. Therefore independent ad hoc provisioning of connectivity by individual mobile devices may actually be limited by available information or may be limited to activities within the boundaries of a homogeneous network.

DETAILED DESCRIPTION

Figure 1:
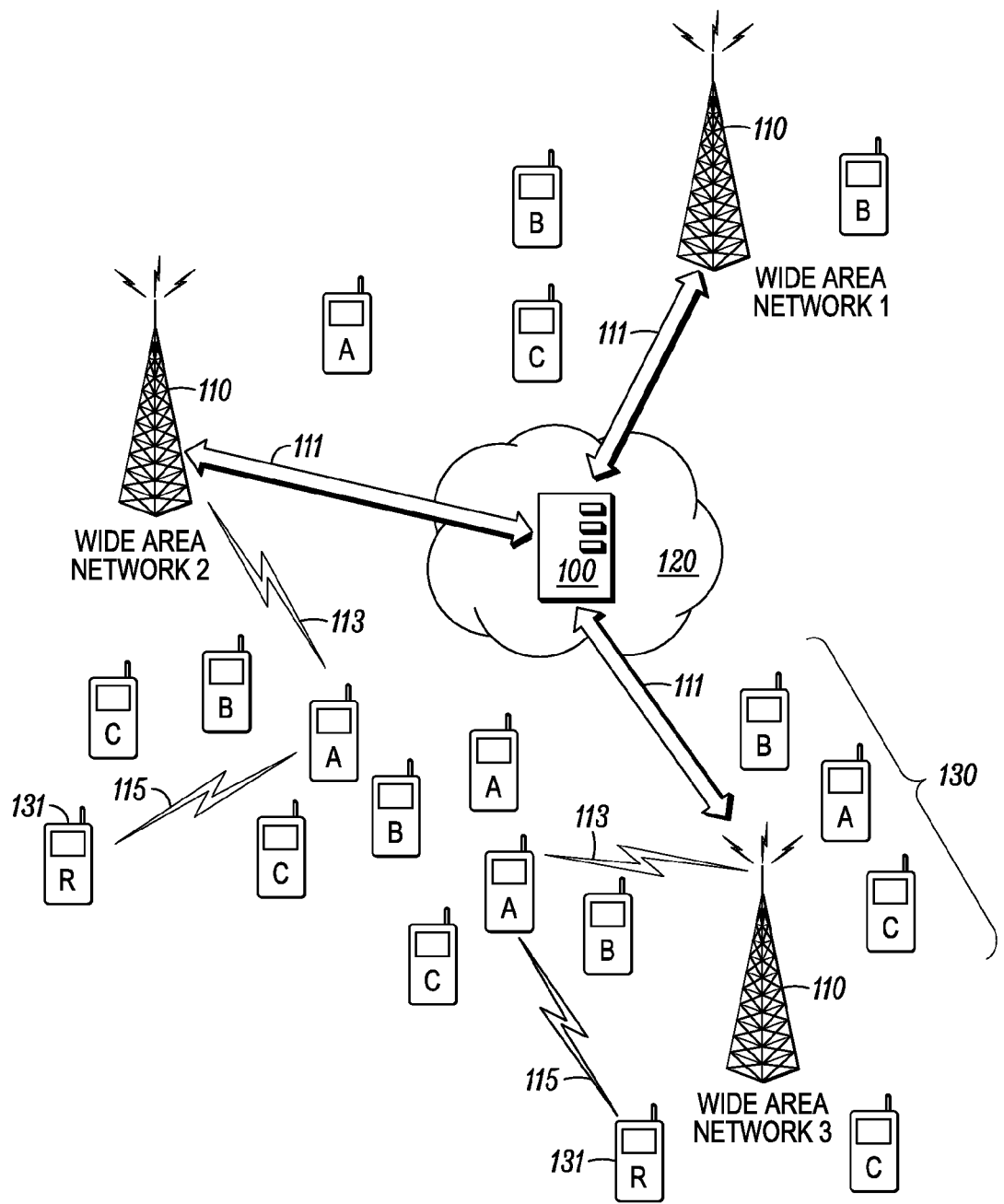
FIG. 1 is a diagram illustrating ad-hoc networking in accordance with an embodiment.

Briefly, the disclosed embodiments include a method of operation that includes collecting physical layer and data layer connectivity information from a plurality of wide area networks using a plurality of mobile devices independently of the wide area networks. A server receives the physical layer and data layer connectivity information and relates the connectivity information to specific wide area networks and to a plurality of geographic locations to create a network statistics database. The server also receives mobile device state information from a plurality of mobile devices including mobile device location information and predicts that connectivity for a specific mobile device will fall below acceptable criteria based on the network statistics database. The server generates a list of candidate donor mobile devices to serve as data connection sources for the specific mobile device based on the network connectivity information and the mobile device state information and selects a donor device from the list of candidate donor devices based on a weighting algorithm.

One method of operation in some embodiments includes collecting physical layer and data layer connectivity information from a plurality of wide area networks using a plurality of mobile devices independently of the wide area networks. Physical layer and data layer connectivity information is received at a server, and related to specific wide area networks and to a plurality of geographic locations to create a network statistics database. Mobile device state information is also received from the plurality of mobile devices including mobile device location information. A determination may then be made that the physical layer or data layer connectivity in a given geographic location for a specific mobile device is below an acceptable criteria based on the network statistics database. A list of candidate donor mobile devices is generated where the candidate donor mobile devices may serve as data connection sources for the specific mobile device based on the network connectivity information and the mobile device state information. A donor device may then be selected from the list of candidate donor devices based on a weighting algorithm.

In some embodiments, the method of operation may also include predicting data usage requirements at a given time and at the given geographic location for the specific mobile device. Additionally, the list of candidate donor mobile devices may be generated in response to a request message from the specific mobile device. The list of candidate donor devices may also be provided to the specific mobile device in response to the request message.

Another method of operation in some embodiments includes receiving a request message from a mobile device requesting data network access in response to determining that physical layer or data layer connectivity in a given geographic location for the mobile device is below an acceptable criteria based on a network statistics database. A plurality of bid probes are sent to a plurality of potential donor mobile devices located within peer-to-peer wireless range of the mobile device. The bid results are received, from the plurality of potential donor mobile devices, and the data backhaul capabilities for each potential donor mobile device is rated. A donor list is sent to the mobile device that lists the potential donor mobile devices along with a data backhaul capability rating for each potential donor mobile device. In some embodiments, the method of operation may also include determining a weighting factor for each potential donor mobile device and including the weighting factor in the donor list. In some embodiments, the weighting factor may be based on battery state, charging state, thermal state and usage state for each potential donor mobile device. A weighting coefficient may be determined, in some embodiments, for each of battery state, thermal state and usage state, based on corresponding thresholds.

The disclosed embodiments also provide a server that includes a network transceiver, operative to provide a connection to the Internet, a network statistics database, and at least one processor, operatively coupled to the network transceiver and to the network information database. The at least one processor operative to perform operations in accordance with the methods described briefly above.

Turning now to the drawings, FIG. 1 illustrates various mobile devices 130 and various heterogeneous wide area networks 110. Each of the various heterogeneous wide area networks 110 is operatively coupled to the Internet 120 via an appropriate backhaul connection 111 and is operative to provide Internet 120 access to subscribed mobile devices. Any one of the plurality of mobile devices 130 may be a subscriber to any one of the heterogeneous wide area networks 110. The plurality of mobile devices 130 change location dynamically such that they may at times be outside of the radio coverage area of any particular wide area network and therefore may no longer be able to establish a data connection with their subscribed wide area network 110. Each one of the mobile devices 130 is able to form a radio connection with its respective wide area network 110 via a wireless radio link 113 that uses the technology appropriate for the particular wide area network 110. Additionally, each one of the mobile devices 130 is also capable to establish a peer-to-peer wireless connection with any other of the mobile devices 130 using a peer-to-peer wireless link 115. The peer-to-peer wireless link 115 may use any suitable technologies such as 802.11, Bluetooth®, or some other appropriate peer-to-peer wireless link technology.

In accordance with the embodiments, each one of the mobile devices 130 may communicate with a server 100 using the mobile device's subscribed wide area network 110 and by way of the appropriate backhaul connection 111 which provides connectivity to the Internet 120. The server 100, in accordance with the embodiments, may be a cloud-based server and may also be a distributed server within the Internet 120. The server 100 provides a coordination function to coordinate ad-hoc network establishment between the mobile devices 130.

In accordance with the embodiments, some of the mobile devices 130 may act as donor devices while others act as receptor devices 131. A donor device serves as a wireless hotspot to a receptor device 131 when the receptor device 131 is unable to access its subscribed wide area network in order to obtain data access. That is, any of the mobile devices 130 may become a receptor device 131 at a particular time or at a particular geographic location that does not provide adequate radio coverage for data access. Accordingly, receptor devices 131 may establish peer-to-peer wireless connections using the aforementioned peer-to-peer wireless link 115 with an appropriate donor device. These peer-to-peer wireless connections are managed by a coordination function of the server 100 in accordance with the embodiments. Each of the mobile devices 130 including the receptor devices 131 are subscribed to an ad-hoc networking service provided by the server 100 in accordance with the embodiments. Accordingly, the server 100 manages, creates and promulgates donor lists based on time and geographic locations. The server 100 also uses a weighting algorithm to prioritize donor devices in the promulgated donor lists.

As one example, and as shown in FIG. 1, each of the mobile devices 130 is a prospective donor device and is assigned a rating for example, "A", "B" or "C" or some other type of rating based on weighting factors that establishes the quality of a data link or other criteria related to the prospective donor device. For example an "A" prospective donor device may be able to provide good wireless link quality and may exhibit good device health such as a high battery level, and be relatively stationary at a given point in time. A "B" rated device may be able to provide only average wireless link quality but has equally good device health to the "A" rated device. A "C" rated device may be able to provide average wireless link quality but may exhibit poor device health (such as a low battery level). The ratings are specific to a donor list that may be obtained from the server 100 by the receptor devices 131 for a given geographic location nearby the location of the respective receptor device 131. In other words, the rating for any specific prospective donor device may change per location, time, etc. and may be different even for the same devices with respect to different donor lists. Therefore, as shown in FIG. 1, the receptor devices 131 may be able to access any of the various devices having "A", "B", or "C" ratings to establish a peer-to-peer wireless link 115. A receptor device 131 will thus select a donor device as determined by a weighting algorithm to best serve the receptor device 131 at a particular point in time and at a particular geographic location.

Figure 2:
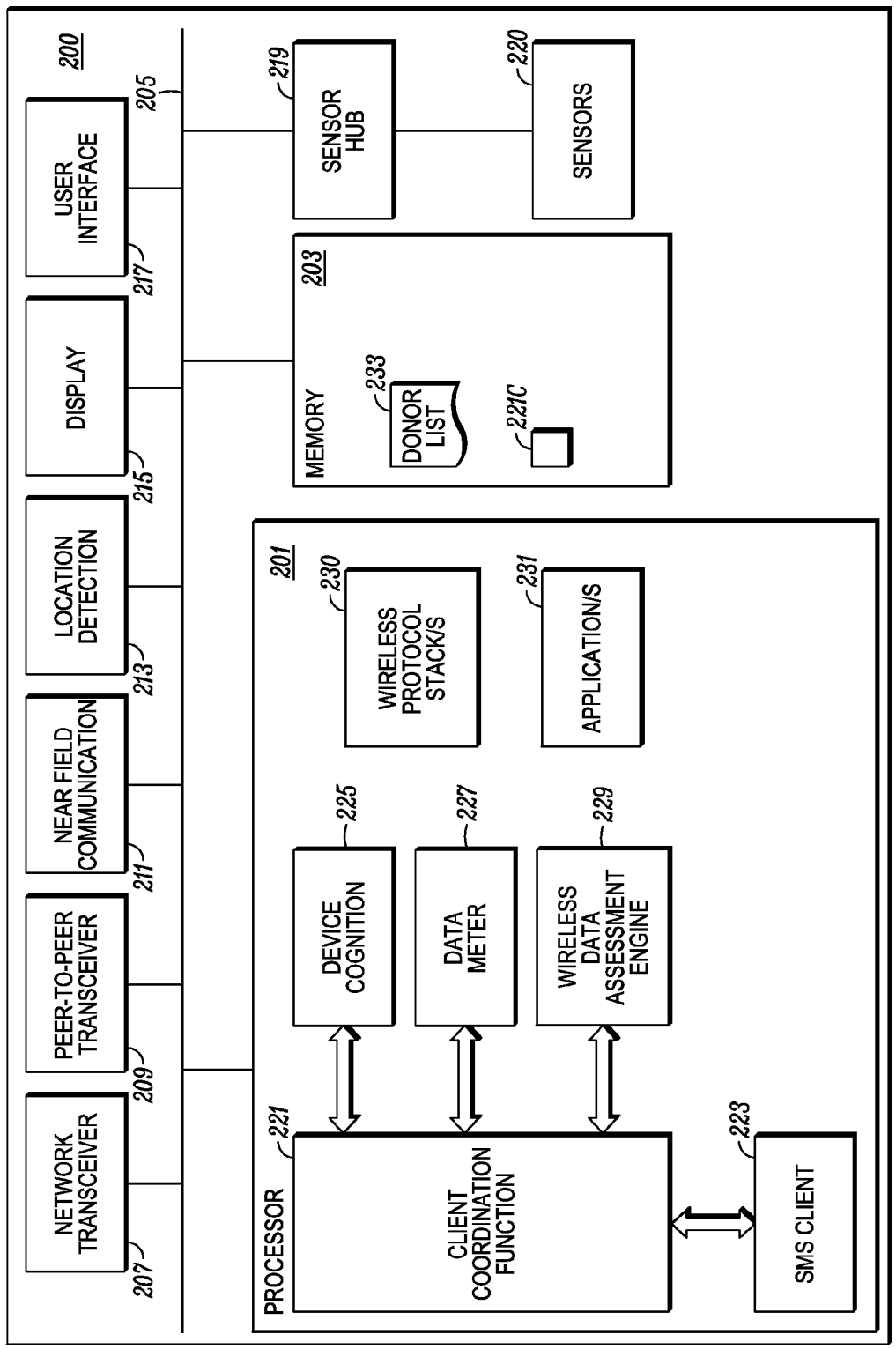
FIG. 2 is block diagram of mobile device in accordance with an embodiment.
Figure 3:
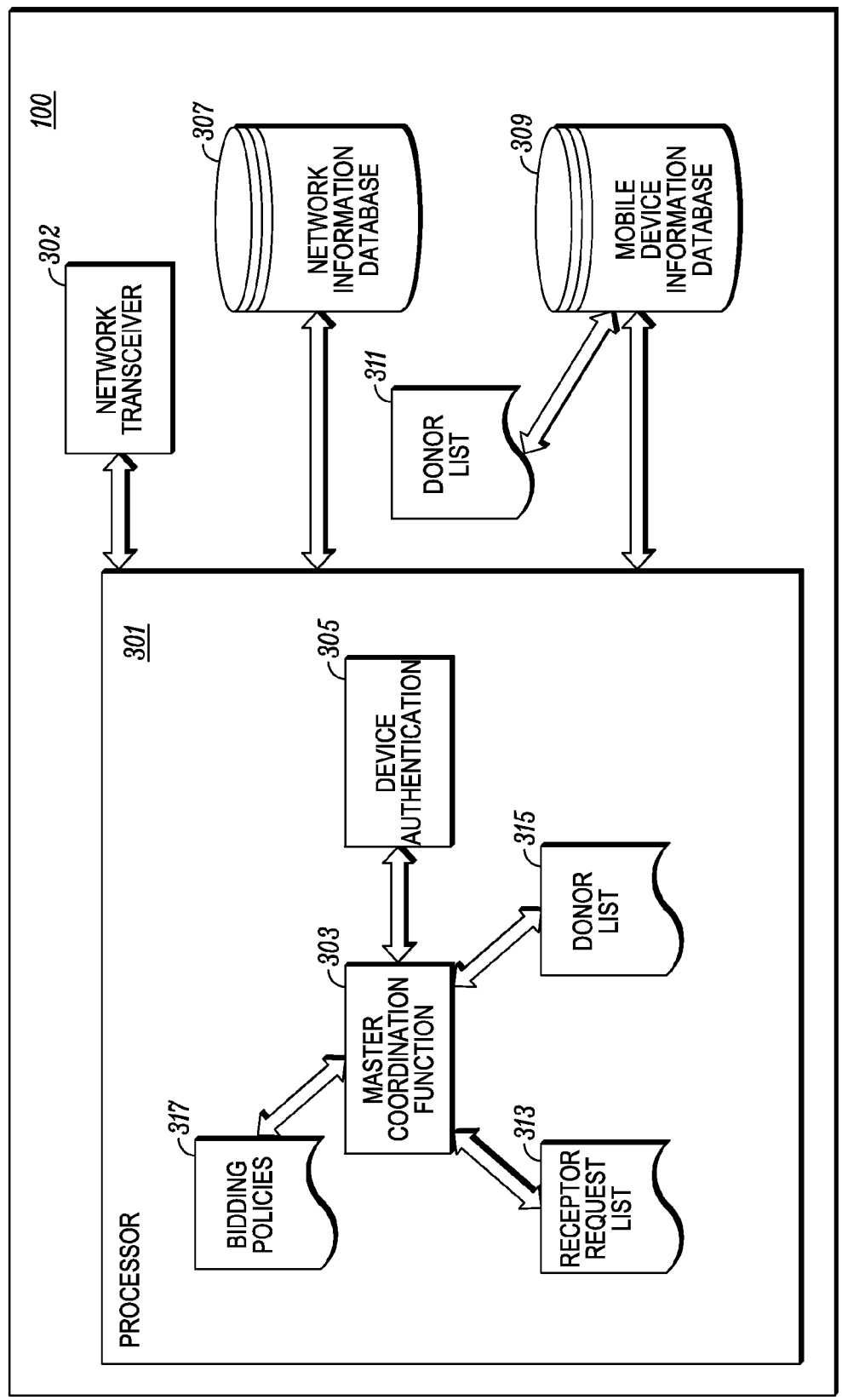
FIG. 3 is block diagram of a server in accordance with an embodiment.

In accordance with the embodiments, each of the mobile devices 130 sends either occasional or periodic updates over its respective subscribed wide area network 110 to the server 100 in order to provide information related to the current service being provided by the mobile device's respective wide area network 110 at specific points in time and at a specific geographic locations. Occasional updates may be triggered in some embodiments by changes in radio frequency (RF) coverage as determined by some RF coverage metric, change of location, or some other criteria. In other embodiments, the updates may be periodic and may occur at predetermined time intervals. Each of the mobile devices 130 includes a client coordination function that determines when the mobile device will obtain data, either from the mobile device itself or from its serving wide area network 110, and when the mobile device will send that data to the server 100. In accordance with the embodiments, the server 100 maintains a network information database and a mobile device information database that is used to coordinate the ad hoc peer-to-peer connection activity of the mobile devices 130 that act as donor devices for receptor devices 131. Also in accordance with the embodiments, the receptor devices 131 may obtain data access from donor devices using a wide area network 110 on which the receptor device 131 is not a subscriber. These methods of operation of the various embodiments may be better understood with respect to the diagrams provided in FIG. 2 and FIG. 3. FIG. 2 provides example details related to the mobile devices 130 including receptor devices 131.

In FIG. 2, an example mobile device 200 includes an internal communication bus 205 which provides operative coupling between the various components. The mobile device 200 components include, but are not limited to, a network transceiver 207, a peer to peer transceiver 209, near field communication logic 211, location detection logic 213, a display 215, a user interface 217, at least one processor 201, a memory 203, and a sensor hub 219. The sensor hub 219 is operatively coupled to a plurality of sensors 220 which may include thermal sensors, proximity sensors, accelerometers, gyroscopic sensors, light sensors, etc. In accordance with the embodiments, the processor 201 is operative to execute a client coordination function 221. The client coordination function 221 may interact and communicate with a short message service (SMS) client 223 via APIs (application programming interfaces) or via other appropriate operative coupling. The client coordination function 221 may also interact and communicate with a device cognition module 225, a data meter 227 and a wireless data assessment engine 229. The processor 201 is also operative to execute at least one wireless protocol stack 230 and various other applications 231. Each of the various components of the mobile device 200 that are operatively coupled to the communication bus 205 may accordingly send information to, or receive information from, the processor 201.

The device cognition module 225 is operative to communicate with the sensor hub 219 to obtain data from the plurality of sensors 220. This data may include information about the position of the mobile device 200, such as whether the mobile device 200 is stationary, in a docking station, placed flatly on a table surface, etc. and other information related to the ambient environment surrounding the mobile device 200. The location detection logic 213 may also be accessed by the device cognition module 225 to obtain location information for the mobile device 200. The client coordination function 221 may manage the collection of data by the device cognition module 225 and may determine time intervals or locations at which the device cognition module 225 is to obtain data from the sensor hub 219 and the location detection logic 213.

The data meter 227 is operative to monitor the network transceiver 207, and/or the peer-to-peer transceiver 209, by way of one or more wireless protocol stacks 230 to determine the data throughput or data rate being achieved for the mobile device 200 at a particular point in time at specific locations. The wireless data assessment engine 229 may also assess characteristics of a wireless channel formed by the network transceiver 207 and report those characteristics to the client coordination function 221. More particularly, the wireless data assessment engine 229 is operative to predict poor or sub optimal radio coverage at specific locations either by monitoring internal functions of the mobile device 200, such as those obtained by the sensor hub 219 or by monitoring inputs that may be received from the server 100 as will be discussed in further detail below. The client coordination function 221 receives these predictions and other information from the device cognition module 225, the data meter 227 and wireless data assessment engine 229 and makes appropriate decisions regarding forming ad hoc connections by the mobile device 200. In situations where the mobile device 200 has lost or suddenly loses radio coverage from its subscribed-to wide area network 110, the SMS client 223 may be used by the client coordination function 221, to send a request message to the server 100 to request ad hoc connectivity to either establish a new wireless data connection via a peer-to-peer wireless link. In accordance with the embodiments, the data connection can be obtained through a donor device using any of the wide area networks 110 including those to which the mobile device 200 is not a subscriber. This is achieved in the various embodiments by way of the server 100 which is illustrated in further detail in FIG. 3.

The server 100 includes at least one processor 301 that is operatively coupled to a network transceiver 302 which enables the server 100 to communicate with the various wide area networks 110 over the backhaul connections 111. The server 100 also maintains a network information database 307 and a mobile device information database 309 which may or may not be integrated onto the server 100. That is, the network information database 307, the mobile device information database 309 or both may be stored on cloud servers remote from the server 100 but that are accessible to the server 100 via network connectivity. In some embodiments, the network information database 307, the mobile device information database 309 or both may also be distributed databases that are distributed among multiple cloud servers. In any of these embodiments, the processor 301 is operatively coupled to the network information database 307 and to the mobile device information database 309 by using any of various appropriate database interface protocols and network connectivity as needed in embodiments having remotely located or distributed databases. In accordance with the embodiments, the processor 301 is operative to execute a master coordination function 303 and a device authentication function 305. In some embodiments, the device authentication function 305 may reside on a different server that is operatively coupled to the server 100 in a manner similar to embodiments using remote or distributed databases. The master coordination function 303, among other things, manages the creation of donor lists, such as donor list 315 and donor list 311, and manages receptor device 131 requests via receptor request list 313. The donor lists may be created or managed in accordance with bidding policies 317 which are also stored and managed by the master coordination function 303 in accordance with the embodiments. The bidding policies 317 may limit potential donor devices from responding to bid probes, or limit usage of bid probe responses, unless certain criteria are met, such as, but not limited to, technical requirements such as being within peer-to-peer wireless range of the receptor device, contractual requirements of the service provided by server 100 or related to one or more of the wide area networks 110 subscription contract requirements, or other requirements and policies, etc.

The network information database 307 contains information related to all of the heterogeneous wide area networks 110 in accordance with information obtained and collected from the mobile devices 130, such as network statistics for coverage and data connectivity. As was discussed above briefly, each of the mobile devices 130 occasionally or periodically sends information to the server 100 related to its connectivity and service level obtained from its subscribed-to wide area network 110. That is, each of the mobile devices 130 also includes the client coordination function 221 and other associated components shown in FIG. 2, such that each mobile device's client coordination function 221 manages the collection of such data in cooperation with the master coordination function 303. For example, the master coordination function 303 may determine how and when the data is sent by the mobile devices 130 to the server 100 and may provide each of the mobile devices 130 with scheduling information. Data that is specific to the mobile devices 130 is stored in the mobile device information database 309.

Each one of the mobile devices 130 is subscribed to a service provided by the server 100 in accordance with the embodiments. Upon accessing and subscribing to the service provided by the server 100 each of the mobile devices 130 receives the client coordination function 221 by a download or by a push operation and the client coordination function executable code 221C is stored in memory 203 of each the mobile device. Thus for example, in mobile device 200, the executable code 221C provides executable instructions that are executable by the processor 201 to execute and run the client coordination function 221 in accordance with the embodiments. Also in accordance with the embodiments, the memory 203 of the mobile device 200 may store a donor list 233 which may be dynamically updated from time-to-time by the master coordination function 303 of the server 100 in conjunction with the client coordination function 221. Donor list 233 is location specific and is useful only for the mobile device 200's most current location. In other words, as the mobile device 200 moves from geographic location to geographic location as defined by the master coordination function 303, the donor list 233 will be updated for the specific mobile device 200 location. This updating is done in accordance with the information stored in the mobile device information database 309 which includes the master donor list 311. The master donor list 311 is a listing of all mobile devices 130 which have volunteered to serve as donor devices either at specific points in time or for specific geographic locations, or generally, according to user settings. For example, these user settings may be provided as inputs to a user interface of the client coordination function 221 presented to the user on the display 215 of the mobile device 200. The settings are then sent to the master coordination function 303 and stored in the mobile device information database 309 for use in creating the master donor list 311. In other words, a mobile device 130 can only be a donor device if it has subscribed to the server 100 networking service, has volunteered to be a donor device, and is listed as a potential donor device in the mobile device information database 309.

In some instances, the mobile device information database 309 will also store dynamic donor lists, such as donor list 315, which correspond to specific geographic locations. In the event that a receptor device 131 requires peer-to-peer connectivity to establish a data connection, the client coordination function 221 on the specific receptor device 131 may send a request message to the master coordination function 303 located on the server 100. If a donor list currently exists that corresponds to the specific geographic location in which the requesting receptor device 131 is currently located then the master coordination function 303 will send that existing donor list, as well as other information related to device authentication, to the receptor device 131. The receptor device 131 may then use that donor list along with the received device authentication information to select an appropriate donor device and to establish a peer-to-peer connection using a peer-to-peer wireless link 115 as was described above with respect to FIG. 1.

In some instances, a donor list may not be available for the specific geographic location where the receptor device 131 is currently located. In that situation, the master coordination function 303 will send out bid probes to the mobile devices 130 and attempt to generate a new donor list for the geographic location. These methods of operation may be further understood with respect to the flowcharts provided in FIG. 4 through FIG. 7.

Figure 4:
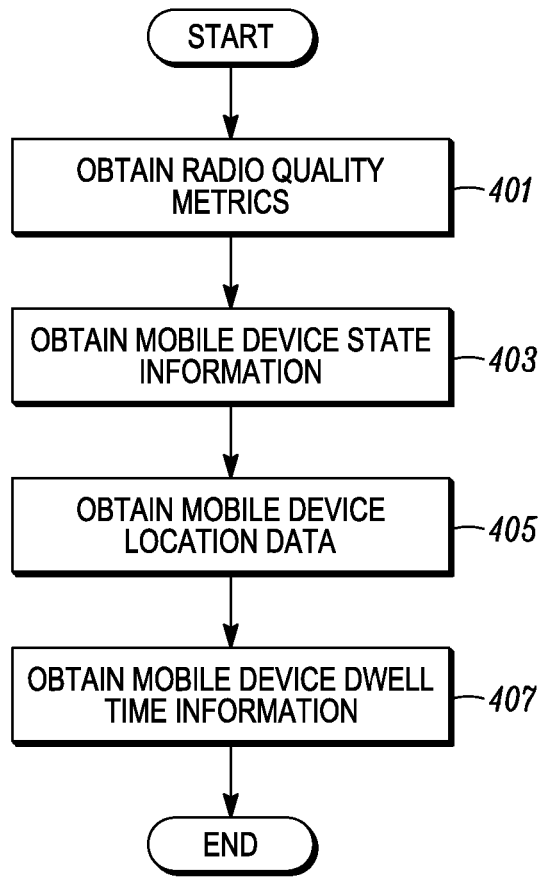
FIG. 4 is flowchart of a method of operation of a mobile device in accordance with an embodiment.

FIG. 4 illustrates a method of operation of the mobile devices 130 in accordance with the embodiments. That is, all of the mobile devices 130 will send the information in accordance with the method of operation as shown in FIG. 4. In operation block 401, a mobile device will obtain radio quality metrics based on RF coverage at a given location from the mobile device's subscribed-to wide area network 110. In operation block 403, the mobile device will obtain mobile device state information. For example, the state information may be obtained from mobile device sensors using, for example, the sensor hub 219 shown in FIG. 2. Other state information may also be obtained from the processor 201 such as, for example, battery charge state, CPU utilization, or other state related information. In operation block 405, location data will be obtained for example by obtaining data from location detection logic 213. In operation block 407, the client coordination function 221 will obtain an estimate of the amount of time that the mobile device may be able (or is willing based on user settings) to provide connectivity to a requesting receptor device. All of this information is then sent by the particular mobile device's client coordination function 221 to the master coordination function 303 located on the server 100. The information is then stored in the mobile device information database 309.

Figure 5:
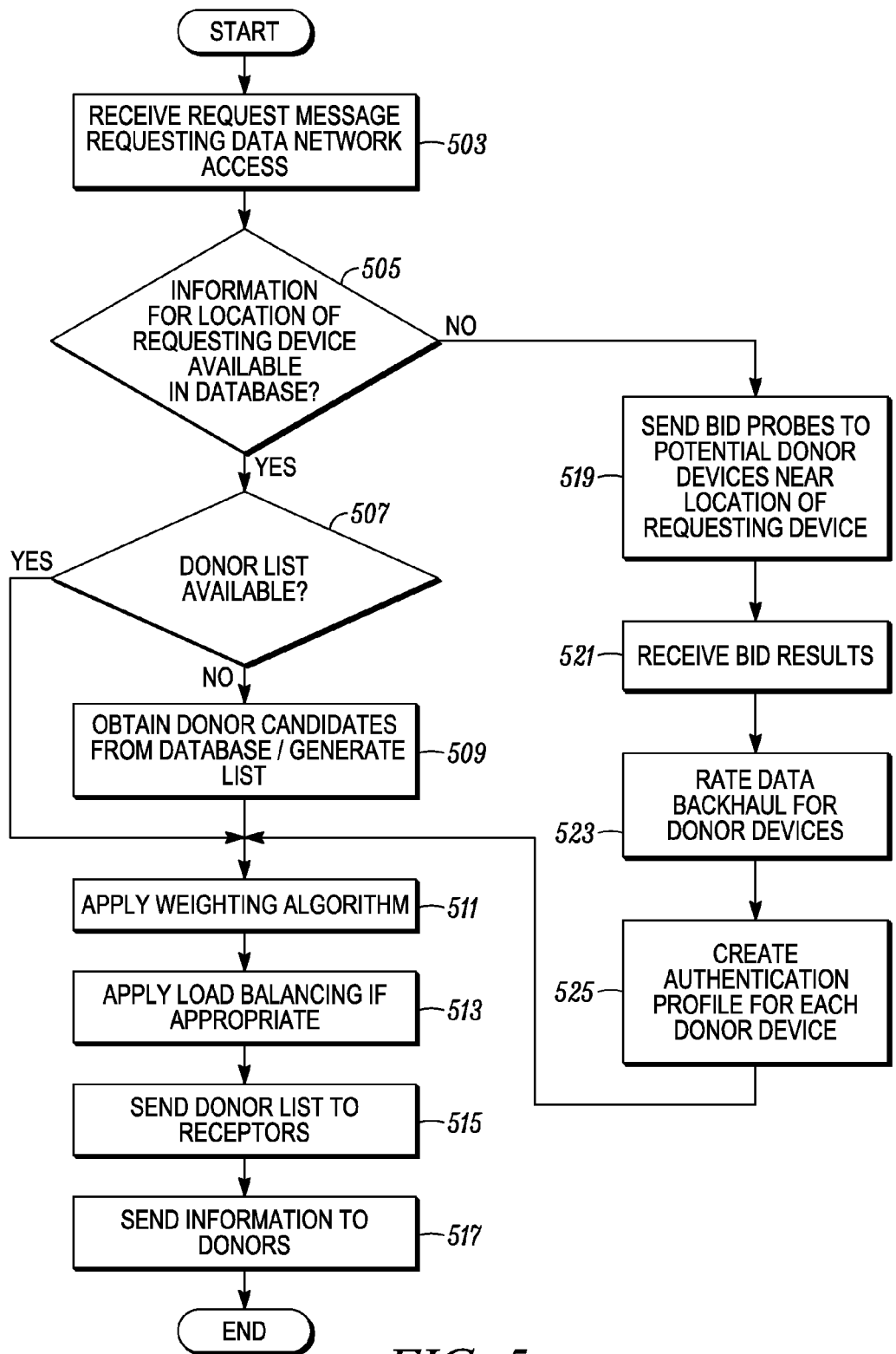
FIG. 5 is a flowchart of a method of operation of a server in accordance with an embodiment.

Turning to FIG. 5, a method of operation of the server 100 in accordance with an embodiment is illustrated. In operation block 503, the server 100 (and thus the master coordination function 303) will obtain a request message requesting data network access from the client coordination function 221 of a receptor device. This request message may be sent via one of the wide area networks 110 or via SMS messages using the SMS client 223. The master coordination function 303, in decision block 505, will check if information for the location of the requesting receptor device is available in the mobile device information database 309. If yes, then the master coordination function 303 will check to see if a donor list is available as shown in decision block 507. If a donor list is available for that location, the master coordination function 303 will apply a weighting algorithm in operation block 511 and may apply a load-balancing algorithm if appropriate in operation block 513. The load-balancing algorithm may be needed in situations where more than one candidate donor device is available and has approximately the same weighting result. If a donor list is not available in decision block 507, the method of operation proceeds to operation block 509 in which the master coordination function 303 will search the database for donor candidates and will generate a new donor list. In this case, the method of operation will again proceed to operation block 511 and will apply the weighting algorithm.

The master coordination function 303 will send the donor list to the receptor in operation block 515 and will send information related to the receptor to the candidate donor devices as shown in operation block 517. This information may be considered a "selection-information-package" and includes authentication information (such as an explicit SSID reference) such that the receptor device and selected donor device may establish a peer-to-peer wireless connection. The method of operation of the master coordination function 303 then ends as shown.

Returning to decision block 505, if the information for the location of the requested device is not available in the mobile device information database 309, the method of operation proceeds to operation block 519. In operation block 519, the master coordination function 303 sends bid probes to potential donor devices that are known to be in a location near the requesting device. This is determined by checking the mobile device information database 309 which is updated on an occasional or periodic basis as was described previously above. In operation block 521, the master coordination function 303 receives the bid results and proceeds to rate the data backhaul for the candidate donor devices as shown in operation block 523. This rating may be performed using any of the information contained in the mobile device information database 309 and the network information database 307.

In operation block 525, the master coordination function 303 communicates with the device authentication function 305 and creates an authentication profile for each candidate donor device contained in the donor list that will be sent to the receptor device. The method of operation may then continue to operation block 511 and continue as was described above until the method of operation ends. In other words, the master coordination function 303 may apply the weighting algorithm to the newly created donor list as shown in operation block 511 and will send the donor list to the receptor devices in operation block 515, etc. Information related to the receptor device will also be sent to candidate donors as shown in operation block 517. The information provided to the candidate donor devices and receptor device includes security information and authentication information generated by the device authentication function 305.

Figure 6:
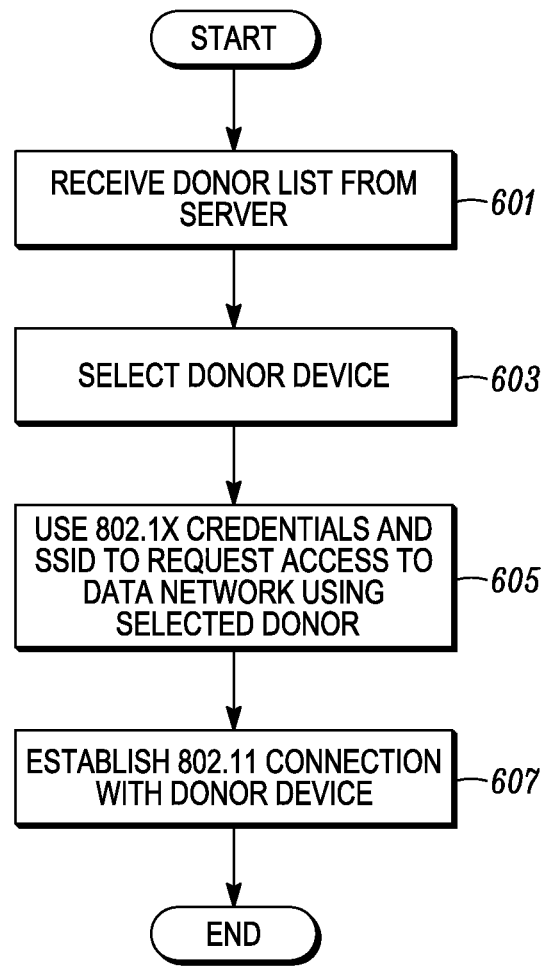
FIG. 6 is a flowchart of a method of operation of a mobile device in accordance with an embodiment.

FIG. 6 illustrates a method of operation that occurs on the receptor device in accordance with an embodiment. After the method of operation shown in FIG. 5 is completed, the receptor device will receive the donor list from the server 100 as shown in operation block 601. In operation block 603, the client coordination function 221 on the receptor device will select a donor device. In some embodiments, the client coordination function 221 will receive the donor list from the server 100 and will itself perform the weighting algorithm to decide which donor device is appropriate. However the client coordination function 221 may, in some embodiments, select the donor device based on the results of the weighting algorithm performed by the master coordination function 303 in operation block 511 of FIG. 5. In operation block 605, the receptor device will use 802.1x credentials and a service set identifier (SSID), received from the master coordination function 303, to request access to the data network using the selected donor. In operation block 607, the receptor device will establish an 802.11 connection (or some other appropriate peer-to-peer wireless connection) with the donor device and the method of operation ends as shown.

Figure 7:
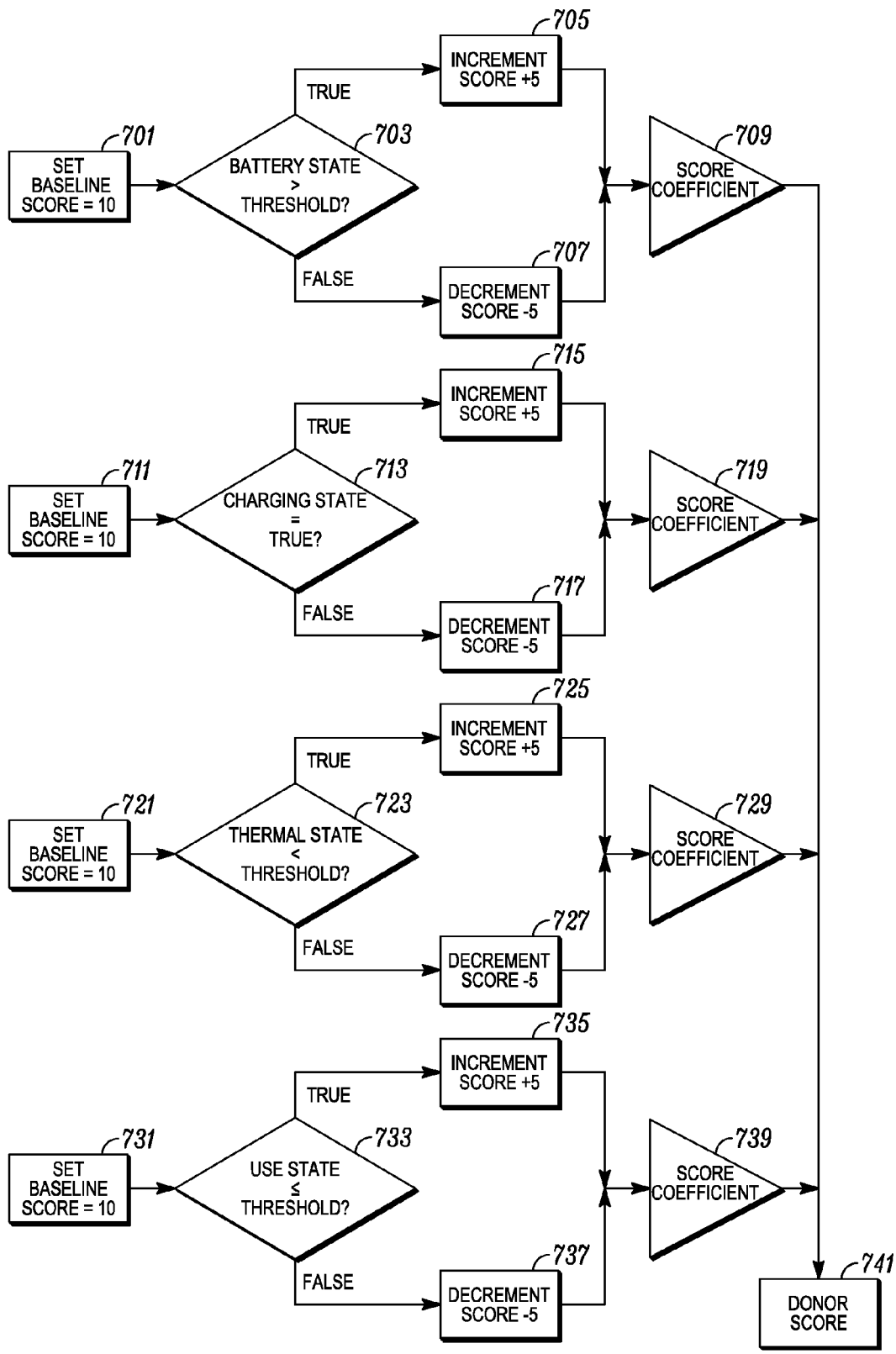
FIG. 7 is a flowchart of method of operation for selecting a donor device in accordance with an embodiment.

FIG. 7 provides an example of the weighting algorithm applied by the master coordination function 303 in operation block 511 of FIG. 5 in accordance with an embodiment. Although the example weighting algorithm illustrated in FIG. 7 shows four criteria as illustrated by decision blocks 703, 713, 723 and 733, other criteria may also be used in addition to those shown in FIG. 7. For each one of the corresponding decision blocks, a corresponding baseline score of 10 is used such as shown in operation block 701, 711, 721 and 731. Thus, proceeding with decision block 703, the weighting algorithm determines whether the battery state of the mobile device is greater than a predetermined threshold. If the battery state is greater than the threshold, the weighting is increased by five points as shown in operation block 705. If the battery state is below the threshold in decision block 703, then the weighting is decreased by five points as shown in operation block 707. A score coefficient is then generated as shown in operation block 709.

In decision block 713, the charging state of the mobile device is checked. If the mobile device is in the charging state, then the weight is incremented by five points as shown in operation block 715 or, if not charging, is decremented by five points as shown in operation block 717 and a score coefficient is generated as shown in operation block 719. The thermal state of the device is checked in decision block 723 and if less-than or equal-to a threshold the weighting is incremented by five points as shown in operation block 725. If the thermal state is not less-than or equal-to the threshold in decision block 723, then the weighting is decremented by five points in operation block 727. A score coefficient is determined in operation block 729. In decision block 733, and usage state is checked to determine whether it is less-than or equal-to a threshold. If so, then the weighting is incremented by five points as shown in operation block 735; if not, then the score is decremented by five points in operation block 737 and the final score coefficient is determined in operation block 739. A final donor score is generated in operation block 741. This donor score is then added to the donor list which is sent to the receptor devices.

Thus in the various embodiments each mobile device 130 subscribed to the ad hoc networking service acts to collect wide area network physical layer and data layer connectivity information from various different, heterogeneous wide area networks 110. Put another way, the mobile devices 130 act as connectivity information collectors for the ad hoc networking service and are used to create the network information database 307 and the mobile device information database 309 and keep them updated as the network topology changes. The server 100 receives the network connectivity information which is related to the specific wide area networks within specific geographic locations. These operations are performed independently and without any involvement of the wide area networks 110 themselves. The master coordination function 303, the mobile device client coordination function 221 or both are operative to use the collected information to determine that data connectivity in a given location is below an acceptable criteria. That is, historical information regarding the network connectivity information is stored along with specific mobile device connectivity information which is used to generate network statistics for the various wide area networks 110. Statistics related to the network may then be stored in the network information database 307 while statistics specific to individual mobile device connectivity may be stored in the mobile device information database 309. That is the network information database 307 may include a network statistics database. The statistics are determined based on collected information and the calculation and determination of such network statistics may be configured through a user interface to the server 100 and the master coordination function 303. Likewise, the mobile device information database 309 includes a mobile device statistics database for mobile device data connectivity at various locations and times. These statistic determinations and calculations may also be configurable through a user interface to server 100 and the master coordination function 303 similar to the case for the network information database 307. In other words the "views" into the collected information may be changed from time-to-time based on application of various statistical analysis techniques to the collected information. More particularly, physical layer and data layer connectivity information collected from the various mobile devices and stored in the network information database 307 is related to the specific wide area networks from which this data is collected and is related to a plurality of geographic locations to create a network statistics database. Thus the network information database 307 is a network statistics database.

The master coordination function 303 generates lists of donor devices to serve as data connection sources based on either the network connectivity information and, if appropriate, also based on specific mobile device information. A donor device may be selected from the list of donor devices based on a cost metric which may include predicting data requirements at a given time and given location for a specific mobile device (i.e. a receptor device). Thus the embodiments provide, among other things, a virtual umbrella network using heterogeneous wide area wireless networks where the virtual umbrella network is facilitated by using peer-to-peer wireless connections. The master coordination function thus operates to provide a list of donor devices to at least one receptor device located within a given location either in response to a request message from the receptor device, or in response to prediction that the receptor device is about to enter into a geographic location having poor RF coverage for wireless data. The predication may be facilitated by either the master coordination function 303, the client coordination function 221, or both in cooperation. The donor devices therefore serve as gateways that may be connected to broadband, or to some non-cellular service.

The mobile devices 130 may send information to the server 100 that is related to, for example, wireless quality, wireless cost, usage context, etc. Therefore based on either a mobile device's location or per a request message (i.e. "on-demand" by a receptor device) the master coordination function 303 prioritizes a set of donors based on the weighting algorithm such as the example weighting algorithm described with respect to FIG. 7.

Also, in some embodiments, receptor devices and donor devices may communicate via the peer-to-peer wireless link 115 (which may be, for example, Bluetooth®, Wi-Fi, NFC or some other suitable wireless technology) with the communication facilitated by the local client coordination function 221 residing on each mobile device.

For connectivity, the selected donors initiate a mobile hotspot with an SSID and use 802.1x port based authentication. The receptor device receives the connectivity information from the master coordination function 303 in advance. In some embodiments, the backhaul traffic conditions for specific donor devices may be included in the connectivity information sent to the receptor device or in the SSID broadcast.

In some embodiments, the weighting algorithm may take into account radio networking costs and may compute a spectral efficiency metric. For example, this may be accomplished using the average CQI reported by the mobile device as per standards. An averaged current drain (bits/mA) metric may also be computed using, for example, averaged "PUSCH Tx Pwr" and mapping it against the current drain profile for specific mobile devices based on empirical measurements for some mobile devices and in some embodiments. A radio link quality metric may be computed using the averaged cell signal quality measurements RSRP, RSRQ, SNR, DL BLER, CQI, UL BLER against pre-registered thresholds for each measurement.

All of the above example measurements may be reported to the server 100 by each mobile device, where the master coordination function 303 acts to rank possible donors based on their generated metrics in real-time. Alternatively, in some embodiments, these measurements may be bundled along within beacon frames which are broadcasted periodically as part of management frames transmissions in 802.11. Also, in some embodiments, a modification may be made to the TIM (Traffic Indication Map) such that donors may broadcast their backhaul capability metric to listening receptor devices.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   collecting, using a plurality of mobile devices, physical layer and data layer connectivity information from a plurality of wide area networks (WANs) independently of the WANs;
   receiving the physical layer and data layer connectivity information at a server and relating the physical layer and data layer connectivity information to specific WANs and to a plurality of geographic locations to create a network statistics database;
   receiving mobile device state information from the plurality of mobile devices including mobile device location information;
   determining that the physical layer or data layer connectivity in a given geographic location for a specific mobile device is below an acceptable criteria based on the network statistics database, wherein the specific mobile device is unable to establish a data connection with one of the plurality of WANs;
   generating a list of candidate donor mobile devices to serve as data connection sources for the specific mobile device for the specific mobile device to be able to establish the data connection with one of the plurality of WANs through the candidate donor mobile devices based on the physical layer and data layer connectivity information and the mobile device state information;
   selecting a donor device from the list of candidate donor devices based on a weighting algorithm; and
   using the selected donor device to establish the data connection between the specific mobile device and the one of the plurality of WANs.

2. The method of claim 1, further comprising:
   predicting data usage requirements at a given time and at the given geographic location for the specific mobile device.

3. The method of claim 1, further comprising:
   generating the list of candidate donor mobile devices in response to a request message from the specific mobile device.

4. The method of claim 1, further comprising:
   providing the list of candidate donor devices to the specific mobile device in response to a request message from the specific mobile device.

5. The method of claim 1, further comprising:
   predicting that the specific mobile device will have unacceptable physical layer or data layer connectivity in the given geographic location based on the network statistics database; and
   generating the list of candidate donor mobile devices for the given geographic location in response to the prediction.

6. The method of claim 1, further comprising:
   predicting that the specific mobile device will have unacceptable physical layer or data layer connectivity in the given geographic location based on the network statistics database; and
   providing the list of candidate donor devices to the specific mobile device in response to the prediction.

7. A method comprising:
   receiving a request message from a mobile device requesting data network access in response to determining that physical layer or data layer connectivity from a plurality of wide area networks (WANs) in a given geographic location for the mobile device is below an acceptable criteria based on a network statistics database, wherein the mobile device is unable to establish a data connection with one of the plurality of WANs;
   sending a plurality of bid probes to a plurality of potential donor mobile devices located within peer-to-peer wireless range of the mobile device and receiving bid results from the plurality of potential donor mobile devices;
   rating data backhaul capabilities for each potential donor mobile device of the plurality of donor mobile devices;

sending a donor list to the mobile device listing the potential donor mobile devices along with a data backhaul capability rating for each potential donor mobile device for the mobile device to be able to establish the data connection with one of the plurality of WANs through the potential donor mobile devices; and using one of the potential donor mobile devices to establish the data connection between the mobile device and the one of the plurality of WANs.

8. The method of claim 7, further comprising:
determining a weighting factor for each potential donor mobile device and including the weighting factor in the donor list.

9. The method of claim 8, further comprising:
determining the weighting factor based on battery state, charging state, thermal state and usage state for each potential donor mobile device.

10. The method of claim 9, further comprising:
determining a weighting coefficient for each of battery state, thermal state and usage state, based on corresponding thresholds.

11. A server comprising:
a network transceiver, operative to provide a connection to the Internet;
a network information database operative to store network statistics; and
at least one processor, operatively coupled to the network transceiver and to the network information database, the at least one processor operative to:
collect, using a plurality of mobile devices, physical layer and data layer connectivity information from a plurality of wide area networks (WANs) independently of the WANs via the Internet;
receive the physical layer and data layer connectivity information at and relate the physical layer and data layer connectivity information to specific WANs and to a plurality of geographic locations and store the related connectivity information in the network information database;
receive mobile device state information from the plurality of mobile devices including mobile device location information over the Internet;
determine that the physical layer or data layer connectivity in a given geographic location for a specific mobile device is below an acceptable criteria based on the network information database, wherein the specific mobile device is unable to establish a data connection with one of the plurality of WANs;
generate a list of candidate donor mobile devices to serve as data connection sources for the specific mobile device for the specific mobile device to be able to establish the data connection with one of the plurality of WANs through the candidate donor mobile devices based on the physical layer and data layer connectivity information and the mobile device state information;
select a donor device from the list of candidate donor devices based on a weighting algorithm; and
using the selected donor device to establish the data connection between the specific mobile device and the one of the plurality of WANs.

12. The server of claim 11, wherein the at least one processor is further operative to:
predict data usage requirements at a given time and at the given geographic location for the specific mobile device.

13. The server of claim 11, wherein the at least one processor is further operative to:
generate the list of candidate donor mobile devices in response to a request message from the specific mobile device.

14. The server of claim 11, wherein the at least one processor is further operative to:
provide the list of candidate donor devices to the specific mobile device in response to a request message from the specific mobile device.

15. The server of claim 11, wherein the at least one processor is further operative to:
predict that the specific mobile device will have unacceptable physical layer or data layer connectivity in the given geographic location based on the network information database; and
generate the list of candidate donor mobile devices for the given geographic location in response to the prediction.

16. The server of claim 11, wherein the at least one processor is further operative to:
predict that the specific mobile device will have unacceptable physical layer or data layer connectivity in the given geographic location based on the network statistics database; and
provide the list of candidate donor devices to the specific mobile device in response to the prediction.

17. A server comprising:
a network transceiver, operative to provide a connection to the Internet;
a network statistics database; and
at least one processor, operatively coupled to the network transceiver and to the network statistics database, the at least one processor operative to:
receive a request message from a mobile device via an Internet connection, the request message requesting data network access in response to determining that physical layer or data layer connectivity from a plurality of wide area networks (WANs) in a given geographic location for the mobile device is below an acceptable criteria based on the network statistics database, wherein the mobile device is unable to establish a data connection with one of the plurality of WANs;
send a plurality of bid probes via Internet connections to a plurality of potential donor mobile devices located within peer-to-peer wireless range of the mobile device and receive bid results from the plurality of potential donor mobile devices;
rate data backhaul capabilities for each potential donor mobile device of the plurality of donor mobile devices;
send a donor list to the mobile device listing the potential donor mobile devices along with a data backhaul capability rating for each potential donor mobile device for the mobile device to be able to establish the data connection with one of the plurality of WANs through the potential donor mobile devices; and
using one of the potential donor mobile devices to establish the data connection between the mobile device and the one of the plurality of WANs.

18. The server of claim 17, wherein the at least one processor is further operative to:
determine a weighting factor for each potential donor mobile device and including the weighting factor in the donor list.

19. The server of claim 18, wherein the at least one processor is further operative to:
  determine the weighting factor based on battery state, charging state, thermal state and usage state for each potential donor mobile device.

20. The server of claim 19, wherein the at least one processor is further operative to:
  determine a weighting coefficient for each of battery state, thermal state and usage state, based on corresponding thresholds.

\* \* \* \* \*